(12) United States Patent
Kwon et al.

(10) Patent No.: US 7,618,186 B2
(45) Date of Patent: Nov. 17, 2009

(54) SELF-CALIBRATING TEMPERATURE SENSORS AND METHODS THEREOF

(75) Inventors: Duk-Min Kwon, Seoul (KR); Kee-Won Kwon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 220 days.

(21) Appl. No.: 11/790,174

(22) Filed: Apr. 24, 2007

(65) Prior Publication Data

US 2007/0286259 A1    Dec. 13, 2007

(30) Foreign Application Priority Data

May 8, 2006   (KR) .................. 10-2006-0041249

(51) Int. Cl.
    *G01K 7/00*    (2006.01)
(52) U.S. Cl. ................ 374/170; 374/178; 365/222
(58) Field of Classification Search ........... 374/178, 374/163, 170; 365/222
    See application file for complete search history.

(56) References Cited

U.S. PATENT DOCUMENTS

| | | | | |
|---|---|---|---|---|
| 4,114,447 A | * | 9/1978 | Creach | 374/170 |
| 4,121,462 A | * | 10/1978 | Mohrman | 374/163 |
| 5,784,328 A | | 7/1998 | Irrinki et al. | |
| 6,067,244 A | * | 5/2000 | Ma et al. | 365/145 |
| 6,333,886 B2 | * | 12/2001 | Cho et al. | 365/222 |
| 6,452,852 B2 | * | 9/2002 | Bohm et al. | 365/222 |
| 6,733,174 B2 | * | 5/2004 | Matsumoto et al. | 374/178 |
| 7,027,343 B2 | * | 4/2006 | Sinha et al. | 365/222 |
| 7,180,211 B2 | * | 2/2007 | Sinha et al. | 307/651 |
| 2003/0086476 A1 | * | 5/2003 | Mizuta | 374/178 |
| 2005/0018513 A1 | | 1/2005 | Hong | |
| 2005/0185491 A1 | | 8/2005 | Kim et al. | |
| 2008/0191917 A1 | * | 8/2008 | McClure et al. | 341/144 |

FOREIGN PATENT DOCUMENTS

| | | |
|---|---|---|
| JP | 10-255467 | 9/1998 |
| JP | 2005-235362 | 9/2005 |
| KR | 10-2005-0011406 | 1/2005 |
| KR | 10-2005-0082579 | 8/2005 |

* cited by examiner

*Primary Examiner*—Andre J Allen
(74) *Attorney, Agent, or Firm*—Harness, Dickey & Pierce, P.L.C.

(57) ABSTRACT

A self-calibrating temperature sensor and a method thereof are provided. The self-calibrating temperature sensor may include a reference voltage generator to generate a reference voltage based on temperature, a digital-to-analog converter to convert a first digital signal into an analog sensing voltage, a comparator to compare the reference voltage with the analog sensing voltage, and to generate a comparison result signal, a digital signal generator to generate and update the first digital signal based on the comparison result signal, a first storage circuit to store the first digital signal based on a first temperature, a data output unit to output data corresponding to a second temperature based on the first digital signal and a second digital signal output from the first storage circuit.

22 Claims, 10 Drawing Sheets

SELF-CALIBRATING TEMPERATURE SENSORS AND METHODS THEREOF

PRIORITY STATEMENT

This application claims priority under 35 U.S.C. § 119 to Korean Patent Application No. 10-2006-0041249, filed on May 8, 2006, in the Korean Intellectual Property Office (KIPO), the entire disclosure of which is incorporated herein by reference.

BACKGROUND

1. Field

Example embodiments relate to sensing temperature in semiconductor apparatuses and methods thereof, for example, example embodiments may relate to temperature sensors with self-calibration functions and comparator offsets in response to process variations, and methods thereof.

2. The Conventional Art

Dynamic random access memory (DRAM) devices of volatile memory may need to refresh data in memory cells by themselves in order to preserve data stored in the memory. Due to this self-refresh operation, self-refresh power is consumed in the DRAM devices. It may be important to reduce the self-refresh power in a system requiring low power consumption.

To reduce the self-refresh power, a refresh period may be changed according to temperature, because data holding time may increase with decreasing temperature in a DRAM device. Accordingly, if an area is divided into a plurality of regions for temperature measurements, and a refresh period is increased in a low temperature region, the self-refresh power may be reduced. However, an embedded temperature sensor having low power consumption may be required to detect internal temperature of the DRAM device or any desired portion of the device.

FIG. 1 illustrates a conventional bandgap type temperature sensor. FIG. 2 illustrates a temperature sensing procedure of the conventional bandgap type temperature sensor illustrated in FIG. 1. The temperature sensor illustrated in FIG. 1 is disclosed in Korean Patent Registration No. 10-045736, entitled "Temperature Sensor Having Shifting Temperature Detection Circuit for Use in High Speed Test and Method for Detecting Shifting Temperature".

Referring to FIG. 1, the conventional bandgap type temperature sensor may include a weighted-resistor string RUA-32RUA for sensing high temperature and a switching unit TU which corresponds to individual resistors of the weighted-resistor string RUA-32RUA. The switching unit TU may selectively short-circuit portions of the weighted-resistor string RUA-32RUA. The switching unit TU may be implemented using transistors, each of which is selectively enabled for short-circuiting in response to a corresponding control signal. The corresponding control signal may be one of signals AU0 through AU5.

Additionally, the conventional bandgap type temperature sensor may include a weighted-resistor string RDA-32RDA for sensing low temperature and a switching unit TD which corresponds to individual resistors of the weighted-resistor string RDA-32RDA. The switching unit TD may selectively short-circuit portions of the weighted-resistor string RDA-32RDA. The switching unit TD may be implemented using transistors, each of which may be selectively enabled for short-circuiting in response to a corresponding control signal. The corresponding control signal may be one of signals /AD0 through /AD5.

A comparator C2 may compare a second voltage V2 with a first voltage V1. V1 may change according to the change in resistance due to the operation of the weighted-resistor string RUA-32RUA or RDA-32RDA, and ON/OFF of each of the transistors in the weighted-resistor string RUA-32RUA or RDA-32RDA. V2 may reflect a voltage of a first diode D1. A comparator C1 may compare the second voltage V2 with a reference voltage Vref of a second diode D2. A comparator C3 may compare an output signal of the comparator C1 with an output signal of the comparator C2. The comparator C3 may output a comparison result signal T45 corresponding to a sensed temperature.

The temperature sensor illustrated in FIG. 1 normally operates only in response to a trip point at a particular temperature. However, because the temperature sensor illustrated in FIG. 1 is very sensitive to variation in manufacturing processes, temperature tuning may need to be performed in individual chips at a wafer level in order to adjust a trip point to a designed or desired temperature point. It may be necessary to detect a shift temperature caused by the variation in manufacturing processes in order to perform temperature trimming during the temperature tuning. In addition, it may be necessary to perform tests at high temperature and low temperature in order to measure an error in weighted resistance caused by process variations.

Referring to FIG. 2, a shift temperature is 5° C., and may correspond to a difference between a designed temperature point (e.g., a target temperature of 45° C.) and a trip point before trimming (e.g., an untrimmed temperature of 50° C.). Temperature sensing may be performed at a high test temperature Tc of 85° C. in order to measure the shift temperature. Initial settings may be: AU5, AU4, AU3, AU2, AU1, AU0=0, 0, 0, 0, 0, 0. Subsequently, if "1" is applied to the control signal AU5 corresponding to a most significant bit (MSB), temperature may increase by 32° C. from a current trip point as illustrated by the arrow ARU5a. Because the increased temperature, i.e., 50° C.+32° C. is lower than the test temperature of 85° C., the control signal AU5 has a value of "1" and the entire digital signal becomes (1,0,0,0,0,0).

If "1" is applied to the control signal AU4, temperature may increase by 16° C. from the current temperature of 82° C. as illustrated by an arrow ARU4a. Because the increased temperature, i.e., 82° C.+16° C. is higher than the test temperature of 85° C., the control signal AU4 has a value of "0". Therefore, a previous start point of 82° C. may become the current start point; and the entire digital signal remains (1,0,0,0,0,0).

If "1" is applied to the control signal AU3, temperature may increase by 8° C. from the current start point of 82° C. as illustrated by the arrow ARU3a. Because the increased temperature, i.e., 82° C.+8° C. is higher than the test temperature of 85° C., the control signal AU3 has a value of "0". Therefore, the previous start point of 82° C. becomes the current start point; and the entire digital signal remains (1,0,0,0,0,0).

If "1" is applied to the control signal AU2, temperature may increase by 4° C. from the current start point of 82° C. as illustrated by the arrow ARU2a. Because the increased temperature, i.e., 82° C.+4° C. is higher than the test temperature of 85° C., the control signal AU2 has a value of "0". Therefore, the previous start point of 82° C. becomes the current start point; and the entire digital signal remains (1,0,0,0,0,0).

If "1" is applied to the control signal AU1, temperature may increase by 2° C. from the current start point of 82° C. as illustrated by the arrow ARU1a. Because the increased temperature, i.e., 82° C.+2° C. is lower than the test temperature of 85° C., the control signal AU1 has a value of "1". Therefore, a temperature of 84° C. becomes the current start point; and the entire digital signal becomes (1,0,0,0,1,0).

If "1" is applied to the control signal AU0, temperature increases by 1° C. from the current start point of 84° C. as illustrated by the arrow ARU0a. Because the increased temperature, i.e., 84° C.+1° C. is equal to the test temperature of 85° C., the control signal AU0 has a value of "1" and the entire digital signal becomes (1,0,0,0,1,1).

Accordingly, the digital signal becomes (1,0,0,0,1,1). Because the digital signal (1,0,0,0,1,1) is equal to a decimal value of 35, if 35° C. is subtracted from the test temperature of 85° C., the current trip point is detected as 50° C. Accordingly, the temperature sensor illustrated in FIG. 1 normally operates only when the current trip point of 50° C. is trimmed to the target temperature of 45° C.

Arrows ARU5 through ARU0 indicate the increase in temperature due to resistance error. Referring to FIG. 2, temperature increase due to actual resistance, (e.g., ARU5) is less than temperature increase due to ideal resistance (e.g., ARU5a). A result of sensing performed at ideal resistance and at the high test temperature of 85° C. is (1,0,0,0,1,1). However, a result of sensing at actual resistance and at the high test temperature of 85° C. is (1,0,0,1,1,1), as illustrated in FIG. 2. Accordingly, error in the actual resistance may need to be obtained in order to accurately sense temperature. It is may be necessary to perform a test at the high test temperature Tc of 85° C. and a test at a low test temperature Td of −5° C. in order to obtain the resistance error. Sensing (illustrated by arrows ARD5 through ARD0) performed at the low test temperature Td of −5° C. is similar to the sensing performed at the high test temperature Tc of 85° C. If a value obtained by subtracting the low test temperature Td of −5° C. from the high test temperature Tc of 85° C. (i.e., 85−(−5)=90) is divided by a value obtained by adding the sensing result of 100111 (=39) at the high test temperature Tc of 85° C. to a sensing result of 111101 (=61) at the low test temperature Td of −5° C. (i.e., 39+61=100), a resistance error of about 10% (i.e., 90/100=0.9) is calculated.

As described above, with respect to the conventional bandgap type temperature sensor, tests need to be performed at two or more temperatures in order to measure an error; and temperature sensing resolution is decreased due to offsets among the three analog comparators. Moreover, temperature trimming must be performed for normal temperature sensing. Since only information on whether a measured temperature is higher or lower than a target temperature can be obtained, a plurality of weighted-resistor strings and switching units are required to sense various temperatures. Furthermore, resistance of a weighted-resistor string becomes double per bit to improve resolution, and therefore, the increase in a circuit area results in the increase in manufacturing cost. In addition, accuracy is decreased due to nonlinearity between voltage and temperature in a diode.

SUMMARY

Example embodiments may provide temperature sensors for increasing sensing resolution with a relatively small circuit area, and methods thereof.

Example embodiments may also provide self-calibrating temperature sensors having a function of automatically calibrating due to errors caused by process variations, and methods thereof.

Example embodiments may also provide self-calibrating temperature sensors having a function of automatically calibrating an offset or nonlinearity of an element included in the temperature sensors, and methods thereof.

Example embodiments may also provide semiconductor apparatuses including temperature sensors, and methods of controlling a self-refresh period of the semiconductor apparatuses using temperature sensing methods.

According to an example embodiment, a self-calibrating temperature sensor may include a reference voltage generator to generate a reference voltage based on temperature, a digital-to-analog converter to convert a first digital signal into an analog sensing voltage, a comparator to compare the reference voltage with the analog sensing voltage, and to generate a comparison result signal, a digital signal generator to generate and update the first digital signal based on the comparison result signal, a first storage circuit to store the first digital signal based on a first temperature, a data output unit to output data corresponding to a second temperature based on the first digital signal and a second digital signal output from the first storage circuit.

According to an example embodiment, a temperature sensing method may include generating and storing a first digital signal based on a comparison of a reference voltage corresponding to a first temperature and a sensing voltage, generating a second digital signal based on a comparison of a reference voltage corresponding to a second temperature and the sensing voltage, and generating data corresponding to the second temperature based on the first digital signal and the second digital signal.

According to an example embodiment, a temperature sensor having a self-calibration function, may include a reference voltage generator, a digital-to-analog converter, a comparator, a digital signal generator, a first storage circuit, and a data output unit.

The reference voltage generator may generate a reference voltage varying with temperature and may include a semiconductor junction diode. The semiconductor junction diode may be implemented using a metal-oxide semiconductor (MOS) transistor with a diode connection (for example, a MOS transistor having a drain and a gate which are connected with each other). The digital-to-analog converter may convert an N-bit digital signal into an analog sensing voltage and outputs the analog sensing voltage. The digital-to-analog converter may be implemented by an R-2R ladder and may have non-linearity having the same polarity as non-linearity of the semiconductor junction diode with respect to temperature.

The comparator may compare the reference voltage with the analog sensing voltage and generates a comparison result signal. The comparator operates in response to an enable signal.

The digital signal generator may change the digital signal based on the comparison result signal.

The first storage circuit may store an output signal output from the digital signal generator at a first temperature (e.g., a reference temperature). The first storage circuit may be a non-volatile memory device or may be implemented by a fuse circuit and/or anti-fuse circuitry.

The data output unit may output data corresponding to a second temperature based on an output signal output from the digital signal generator at the second temperature and an output signal from the first storage circuit.

According to an example embodiment, a semiconductor apparatus may include a temperature sensor and a refresh control circuit controlling a self-refresh cycle in response to the data corresponding to the second temperature.

According to an example embodiments, a temperature sensing method may include the operations of comparing a reference voltage corresponding to a first temperature with a sensing voltage and generating and storing a first digital signal based on a comparison result, comparing a reference voltage corresponding to a second temperature with the sensing voltage and generating a second digital signal based on a comparison result, and generating data corresponding to the second temperature based on the first digital signal and the second digital signal.

The operation of comparing reference voltage with the sensing voltage and generating and storing the first digital signal may include generating the reference voltage at the first temperature, converting the first digital signal into the sensing voltage, comparing the reference voltage at the first temperature with the sensing voltage, and selectively updating at least one bit in the first digital signal based on the comparison result. The operation of comparing reference voltage with the sensing voltage and generating and storing the second digital signal may include generating the reference voltage at the second temperature, converting the second digital signal into the sensing voltage, comparing the reference voltage at the second temperature with the sensing voltage, and selectively updating at least one bit in the second digital signal based on the comparison result.

Accordingly example embodiments may provide a method of controlling a self-refresh period, including the above-described temperature sensing method, and controlling the self-refresh period of a semiconductor apparatus based on the data corresponding to the second temperature.

BRIEF DESCRIPTION OF THE DRAWINGS

Example embodiments will become more apparent by describing in detail example embodiments with reference to the attached drawings in which.

DETAILED DESCRIPTION OF EXAMPLE EMBODIMENTS

Figure 1:
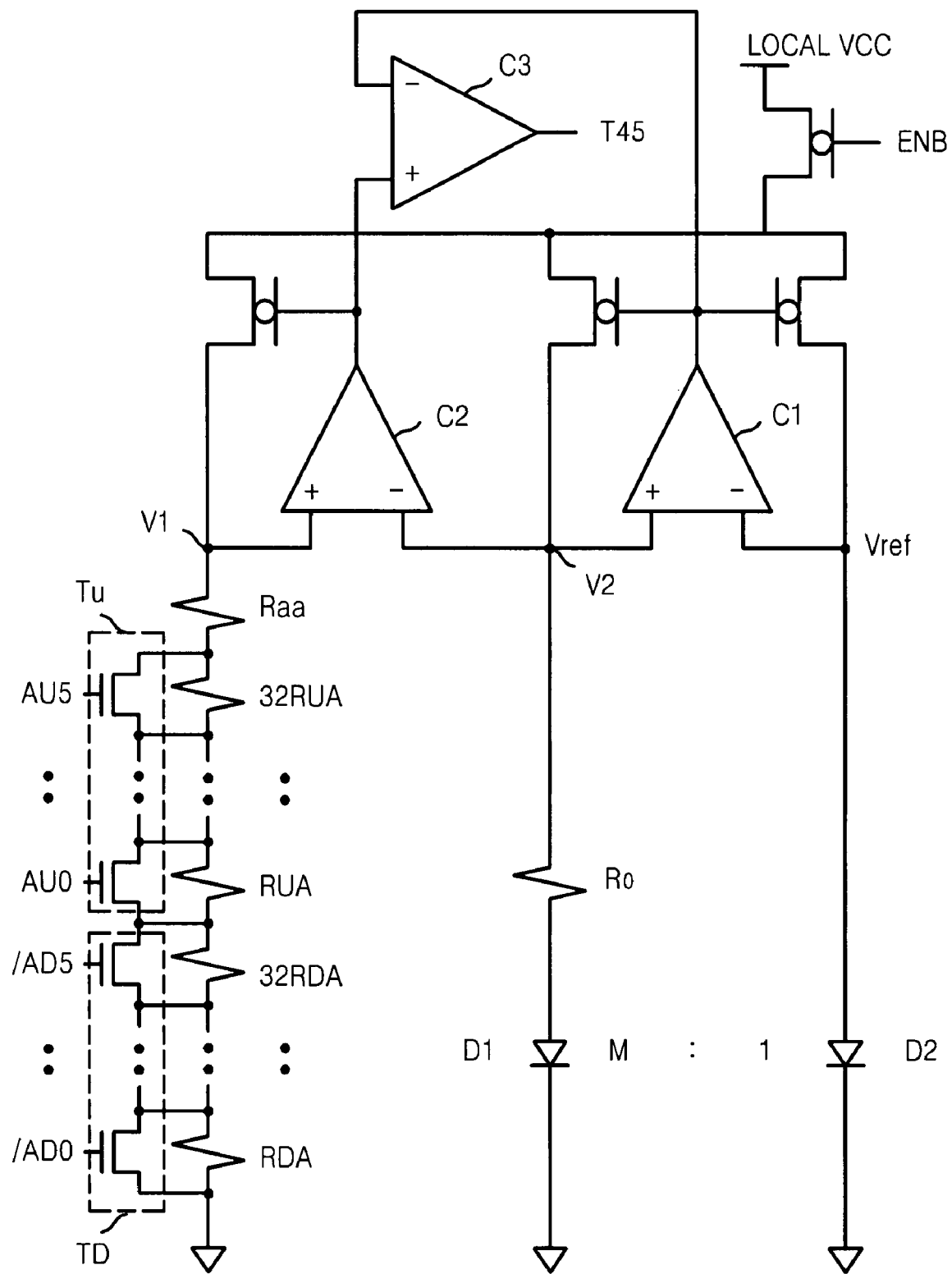
FIG. 1 illustrates a conventional bandgap type temperature sensor.
Figure 2:
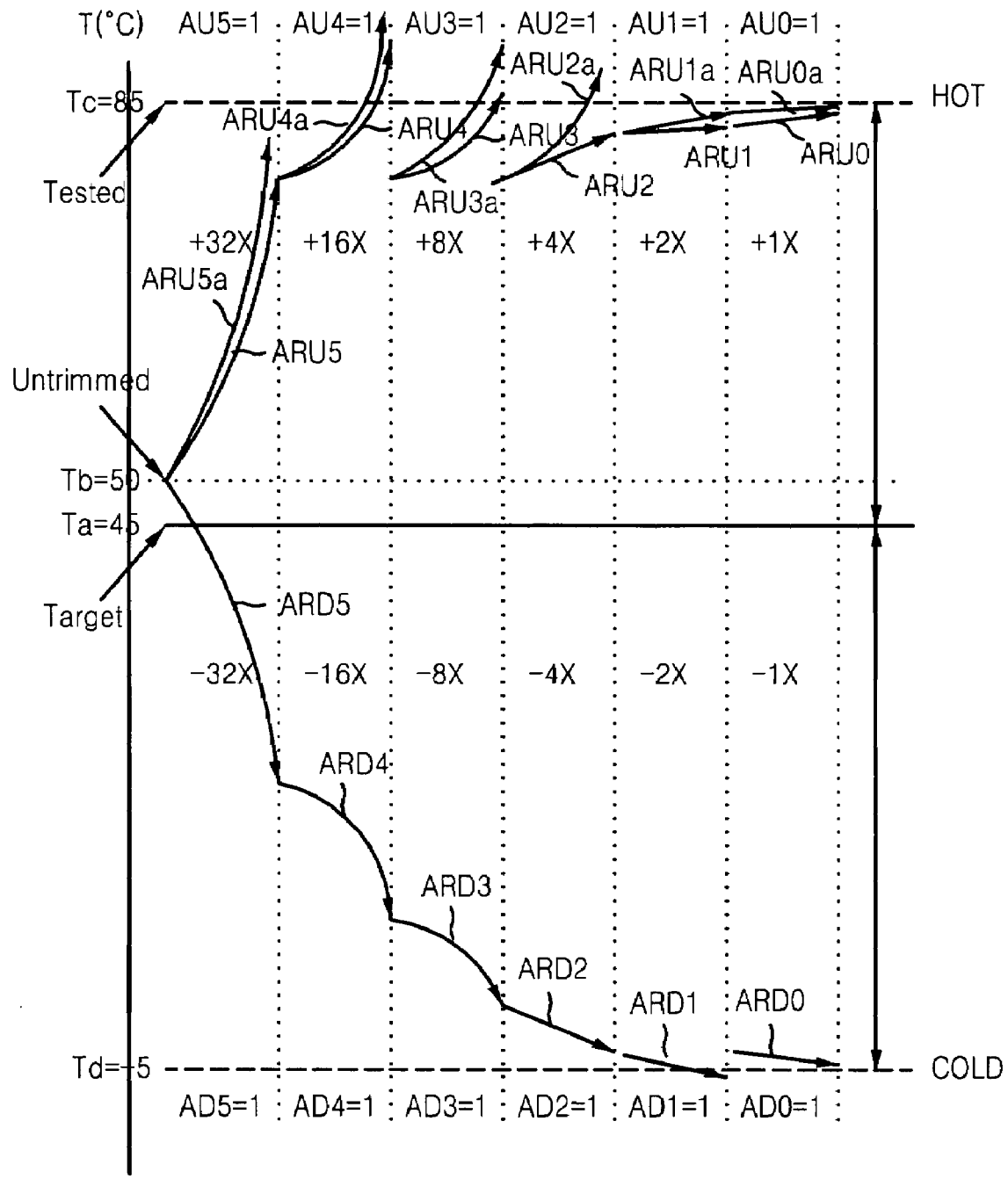
FIG. 2 illustrates a temperature sensing procedure of the conventional bandgap type temperature sensor illustrated in FIG. 1.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, example embodiments will be described in detail with reference to the attached drawings. Like reference numerals in the drawings denote like elements.

Figure 3:
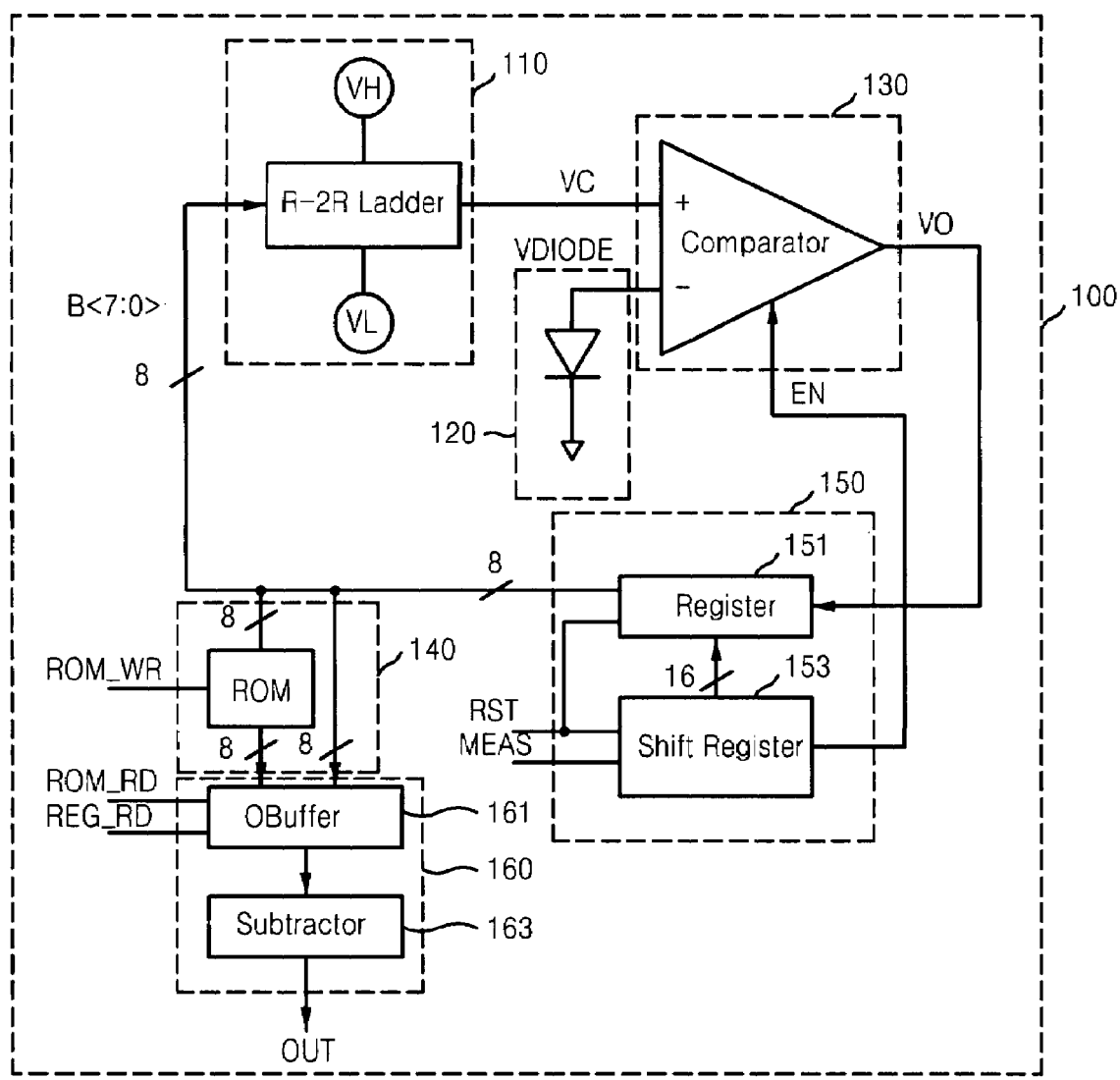
FIG. 3 is a block diagram of a temperature sensor, according to an example embodiment.

FIG. 3 is a block diagram of a temperature sensor 100, according to an example embodiment. The temperature sensor 100 may include a digital-to-analog converter 110, a reference voltage generator 120, a comparator 130, a first storage circuit 140, a digital signal generator 150, and a data output unit 160.

The reference voltage generator 120 may generate a reference voltage VDIODE varying with temperature. The reference voltage generator 120 may include a semiconductor junction diode. The diode may be implemented by a metal-oxide semiconductor (MOS) transistor with a diode connection. For example, if a drain is connected to a gate in an N-channel MOS (NMOS) transistor or a P-channel MOS (PMOS) transistor, the NMOS (or PMOS) transistor may be used as a diode. Because voltage at the diode may vary with temperature, the reference voltage VDIODE may also vary with the temperature.

The digital-to-analog converter 110 may receive an N-bit digital signal such as B<7:0> (where N is 1 or a natural number greater than 1; and, for example, is 8 in the example embodiment) output from the digital signal generator 150. The digital-to-analog converter 110 may convert the N-bit digital signal into an analog sensing voltage VC. The digital-to-analog converter 110 may be implemented by an R-2R ladder, but example embodiments are not restricted thereto. For example, any digital-to-analog converter which may, for instance, convert an N-bit digital signal to an analog voltage may just as easily be used.

The comparator 130 may compare the reference voltage VDIODE with the analog sensing voltage VC. The comparator 130 may output a comparison result signal VO at a low level (e.g., "0") or a high level (e.g., "1").

The digital signal generator 150 may change the N-bit digital signal (e.g., B<7:0>) based on the comparison result signal VO, and may output a changed digital signal B<7:0>. For example, the digital signal generator 150 may selectively update at least one bit in the digital signal B<7:0> based on the comparison result signal VO output from the comparator 130. Accordingly, if the digital signal B<7:0> is 8 bits, an initial value (e.g., 1) may be set for at least one bit, and the analog sensing voltage VC may be compared with the reference voltage VDIODE. The initial value of the bit may be maintained or changed to a different value (e.g., 0) according to the comparison result. This procedure may be performed for each of the 8 bits. For example, after the procedure is performed eight times, the digital signal B<7:0> output from the digital signal generator 150 may be fully determined.

The digital signal generator 150 may include a second storage circuit 151 and a controller 153. The second storage circuit 151 may temporarily store the digital signal B<7:0>. The second storage circuit 151 may be implemented by an N-bit register, but example embodiments are not restricted to any particular size. For example, an eight-bit register may be used just as easily as a sixteen-bit register. In response to a reset signal RST and a measurement signal MEAS, the controller 153 may generate and output control signals for controlling the second storage circuit 151 and an enable signal EN for controlling the operation of the comparator 130. The controller 153 may be implemented by a 2N-bit shift register (e.g., sixteen-bit shift register), but example embodiments are not restricted thereto.

The first storage circuit 140 may store the digital signal B<7:0> output from the digital signal generator 150 in response to a read-only memory (ROM) write signal ROM_WR. The first storage circuit 140 may be implemented by N-bit non-volatile memory. In other words, the first storage circuit 140 may be implemented by non-volatile memory such as programmable read-only memory (PROM), erasable programmable read-only memory (EPROM), electrically erasable programmable read-only memory (EEPROM), and/or flash memory, but example embodiments are not restricted thereto. For example, the first storage circuit 140 may alternatively be implemented by an anti-fuse circuit. In other words, if it is not necessary to change a value of a digital signal stored in the first storage circuit 140, the first storage circuit 140 may be implemented by an anti-fuse circuit including a plurality of anti-fuses (not shown) to store data according to selective short circuiting of the anti-fuses.

The data output unit 160 may perform an operation with respect to a first digital signal stored in the first storage circuit 140 and a second digital signal output from the digital signal generator 150, i.e., a digital signal stored in the second storage circuit 151. The data output unit 160 may output operation results external to the temperature sensor 100 (e.g., devices and/or storage device external to the temperature sensor 100). The data output unit 160 may include a buffer 161 and a subtractor 163.

The buffer 161 may buffer and output the first digital signal read from the ROM, i.e., from the first storage circuit 140 in response to a ROM read signal ROM_RD. The buffer 161 may also buffer and output the second digital signal read from the register 151 in response to a register read signal REG_RD.

The subtractor 163 may calculate and output a difference between the first digital signal and the second digital signal. If a temperature (e.g., a reference temperature, for example, 85° C.) corresponding to the first digital signal is known, a temperature corresponding to the second digital signal may be obtained using the difference between the first digital signal and the second digital signal. The data output unit 160 may further include a circuit for calculating a temperature corresponding to the second digital signal using the difference between the first digital signal and the second digital signal. For example, such a circuit may be implemented with a look-up table, ROM, RAM, and/or any suitable conversion or calculation circuit. However, it should be noted that example embodiments should not be limited to only these examples.

The overall operation flow of the temperature sensor 100 will be described below.

For example, if the first digital signal is sensed as "01111011" as a result of performing a test at the reference temperature (e.g., 85° C.), the first digital signal may be stored in the first storage circuit 140. Subsequently, if a signal "01111111" is sensed at a temperature to be measured as a result of the sensing temperature, the signal "01111111" (i.e., the second digital signal) may be stored in the second storage circuit 151.

The signal "01111011" stored in the first storage circuit 140 may be output to the subtractor 163 via the buffer 161 included in the data output unit 160 in response to the ROM read signal ROM_RD. The signal "01111111" stored in the second storage circuit 151 may be output to the subtractor 163 via the buffer 161 included in the data output unit 160, in response to the register read signal REG_RD. The subtractor 163 may subtract the signal "01111011" read from the first storage circuit 140 from the signal "01111111" read from the second storage circuit 151 and may output a subtraction result "00000100" externally. For example, if the temperature sensor 100 is designed such that one-bit difference corresponds to a 1° C. difference, a temperature value of 4° C. corresponding to the subtraction result "00000100" may be added to the example reference temperature of 85° C. As a result, a measured temperature may be 89° C. A value of an actual temperature difference corresponding to the one-bit difference may be stored in an external register (not shown).

If temperature is measured using the above-described method, information on an input offset of the comparator 130 may be reflected in the first digital signal, and thus stored in the first storage circuit 140. The information on the offset may also be reflected in the second digital signal, which may be generated at a temperature to be measured. Accordingly, if subtraction is performed on the two digital signals, the input offset of the comparator 130 may be corrected. Additionally, because temperature trimming may not be needed in example embodiments, the temperature sensor 100 may perform temperature sensing at various temperatures without additionally including weighted-resistor strings and switching units. Weighted resistor strings and switching units are needed to sense different temperatures in the conventional temperature sensor illustrated in FIG. 1.

Figure 4:
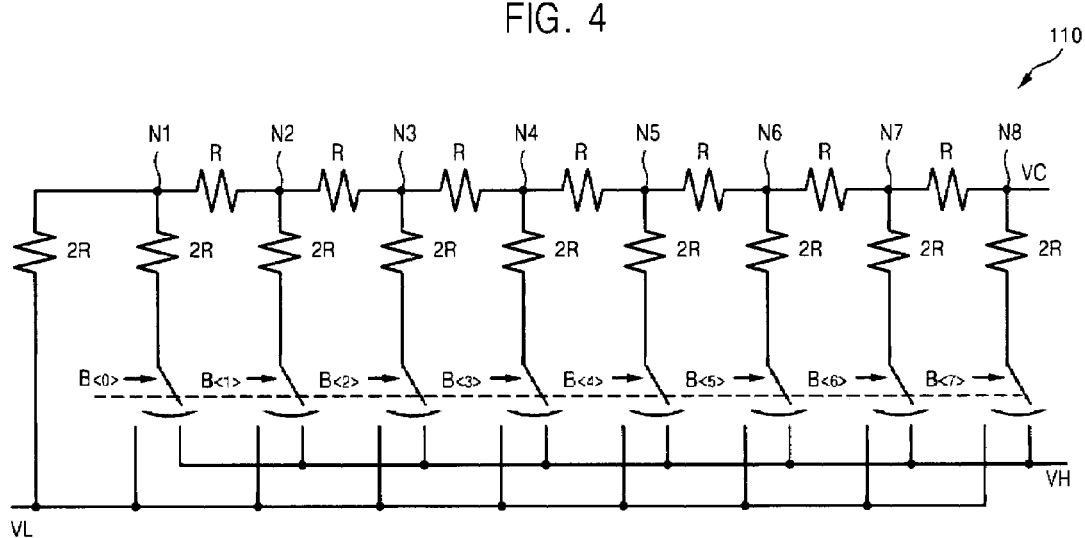
FIG. 4 is a circuit diagram of an 8-bit R-2R ladder implemented as a digital-to-analog converter illustrated in FIG. 3, according to an example embodiment.

FIG. 4 is a circuit diagram of an 8-bit R-2R ladder implemented as the digital-to-analog converter 110 illustrated in FIG. 3, according to an example embodiment. Referring to FIG. 3 and 4, the R-2R ladder 110 may include a plurality of first resistors R connected in series between a first node N1 and an eighth node N8. The R-2R ladder 110 may further include a plurality of second resistors 2R whose ends are connected to the first through eighth nodes N1 through N8, respectively, and a plurality of switches.

One end of each switch of the plurality of switches may be connected to a corresponding second resistor 2R. The other end of each switch may be selectively connected to a bridge of high voltage VH or a bridge of low voltage VL in response to a corresponding bit signal B<0>, B<1>, B<2>, B<3>, B<4>, B<5>, B<6>, or B<7> in the digital signal B<7:0> output from the digital signal generator 150.

The bit B<0> may be the least significant bit (LSB) of the digital signal B<7:0>. The bit B<7> may be the most significant bit (MSB) of the digital signal B<7:0>. The analog sensing voltage VC of the R-2R ladder 110 may be determined by the bit signals B<0> through B<7>, the low voltage VL, and the high voltage VH according to Equation (1) below:

$$VC = \left( \begin{array}{l} VL + VB0 \times 2^0 + VB1 \times 2^1 + VB2 \times 2^2 + \\ VB3 \times 2^3 + VB4 \times 2^4 + VB5 \times 2^5 + \\ VB6 \times 2^6 + VB7 \times 2^7 \end{array} \right) \Big/ 2^8, \quad (1)$$

Referring to Equation (1), VB0 through VB7 may have a VL value or a VH value according to the bits B<0> through B<7>, respectively.

For example, if VL=0.2 V, VH=1.2 V, B<0>=0, VB0=0.2, and B<0>=1, VB0=1.2.

In addition, if the digital signal B<7:0> is 00000000, VB0 through VB7 have a value of 0.2, and VC=0.2 according to Equation (1).

If the digital signal B<7:0> is 00000001, VB0=1.2 and VB1 through VB7 have a value of 0.2; and VC=0.203906 according to Equation (1).

If the digital signal B<7:0> is 11111111, VB0 through VB7 have a value of 1.2; and VC=1.196875 according to Equation (1).

In other words, the analog sensing voltage VC may have a value in a range of about VL to VH.

If the R-2R ladder 110 is used, it may be advantageous in that only one first resistor R and one second resistor 2R may need to be added in order to increase resolution by one bit. In the conventional bandgap type temperature sensor illustrated in FIG. 1, because 64 weighted resistors RUA or RDA must be added in order to add one bit of resolution, a necessary area is largely increased, thus manufacturing cost may also be increased.

Figure 5:
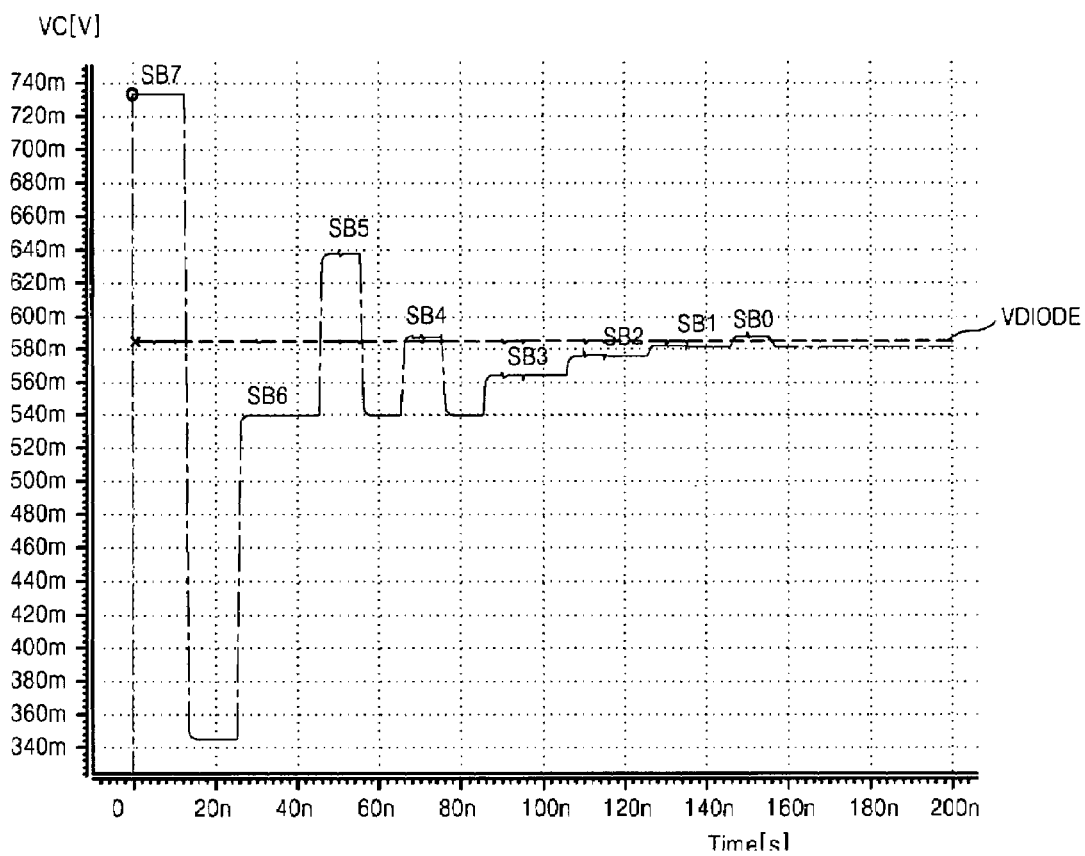
FIG. 5 is a graph illustrating a procedure of sensing an analog sensing voltage using the R-2R ladder illustrated in FIG. 4.

FIG. 5 is a graph illustrating a procedure of sensing the analog sensing voltage VC using the R-2R ladder 110 illustrated in FIG. 4. Referring to FIGS. 4 and 5, the digital signal B<7:0> may be set initially to 00000000. Subsequently, the individual bits of the digital signal B<7:0> may be sequentially applied at a high level of "1" starting from the MSB, i.e., B<7>. At each application of the high level, a binary successive approximation method may be performed.

If the bit B<7> is applied at the high level of "1" (SB7), the analog sensing voltage VC is higher than the reference voltage VDIODE, and therefore, the bit B<7> transitions to a low level of "0". As a result, the digital signal B<7:0> remains 00000000. If the bit B<6> is applied at the high level of "1" (SB6), the analog sensing voltage VC is lower than the reference voltage VDIODE, and therefore, the bit B<6> remains at the high level of "1". As a result, the digital signal B<7:0> is updated to 01000000. If the bit B<5> is applied at the high level of "1" (SB5), the analog sensing voltage VC is higher than the reference voltage VDIODE, and therefore, the bit B<5> transitions to the low level of "0". As a result, the digital signal B<7:0> remains 01000000. If the bit B<4> is applied at the high level of "1" (SB4), the analog sensing voltage VC is higher than the reference voltage VDIODE, and therefore, the bit B<4> transitions to the low level of "0". As a result, the digital signal B<7:0> remains 01000000. If the bit B<3> is applied at the high level of "1" (SB3), the analog sensing voltage VC is lower than the reference voltage VDIODE, and therefore, the bit B<3> remains at the high level of "1". As a result, the digital signal B<7:0> is updated to 01001000. If the bit B<2> is applied at the high level of "1" (SB2), the analog sensing voltage VC is lower than the reference voltage VDIODE, and therefore, the bit B<2> remains at the high level of "1". As a result, the digital signal B<7:0> is updated to 01001100. If the bit B<1> is applied at the high level of "1" (SB1), the analog sensing voltage VC is lower than the reference voltage VDIODE, and therefore, the bit B<1> remains at the high level of "1". As a result, the digital signal B<7:0> is updated to 01001110. If the bit B<0> is applied at the high level of "1" (SB0), the analog sensing voltage VC is higher than the reference voltage VDIODE, and therefore, the bit B<0> transitions to the low level of "0". As a result, the digital signal B<7:0> remains 01001110.

Figure 6A:
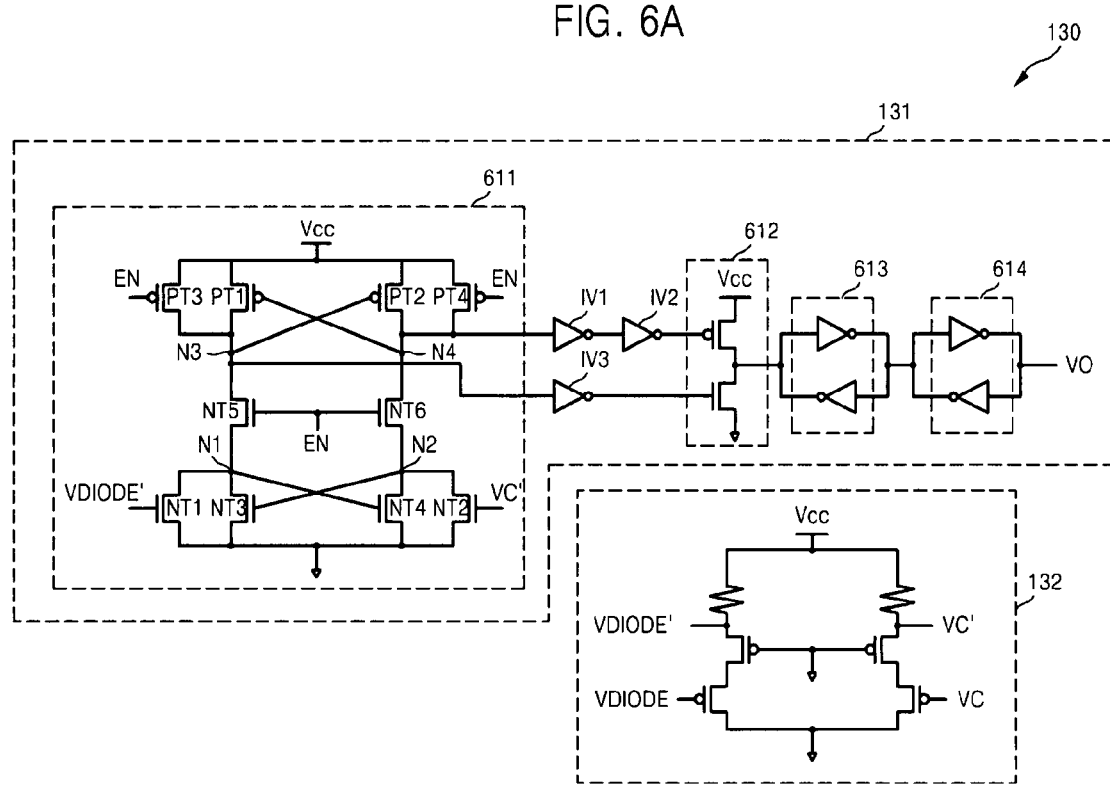
FIG. 6A is a circuit diagram of a comparator illustrated in FIG. 3, according to an example embodiment.

FIG. 6A is a circuit diagram of the comparator 130 illustrated in FIG. 3, according to an example embodiment. Referring to FIG. 6A, the comparator 130 may include a comparison circuit 131 and a noise protection circuit 132.

The noise protection circuit 132 may receive the reference voltage VDIODE and the analog sensing voltage VC. The noise protection circuit 132 may generate a noise-protected reference voltage VDIODE' and a noise-protected analog sensing voltage VC', which may be input by the comparison circuit 131. The noise protection circuit 132 may operate to protect the reference voltage VDIODE and the analog sensing voltage VC from being influenced by switching noise of the enable signal EN and the associated transistors. It may be preferable that the noise-protected reference voltage VDIODE' and the noise-protected analog sensing voltage VC' generated by the noise protection circuit 132 are input by the comparison circuit 131, but the reference voltage VDIODE and the analog sensing voltage VC may be directly input by the comparison circuit 131 as well. Thus, example embodiments are not limited to comparators using noise protection circuits. The noise protection circuit 132 may be implemented in a form of a differential amplifier, as illustrated in FIG. 6A.

The comparison circuit 131 may include a main comparison block 611, a plurality of inverters IV1 through IV3, an inverter 612, a first latch 613, and a second latch 614. The main comparison block 611 may be implemented similar to a differential amplifier, and may include a plurality of NMOS transistors NT1 through NT6 and a plurality of PMOS transistors PT1 through PT4.

Responsive to the enable signal EN, the main comparison block 611 may receive the noise-protected reference voltage VDIODE' and the noise-protected analog sensing voltage VC', may compare them with each other, and may output a differential output signal through third and fourth nodes N3 and N4. The main comparison block 611 may operate in response to a signal having a predetermined (or alternatively, a desired) period of time delayed than the enable signal EN, instead of only the enable signal EN. The enable signal EN will be described in detail subsequently.

If the analog sensing voltage VC is higher than the reference voltage VDIODE, the operation of the comparator 130 may be as follows.

If the analog sensing voltage VC is higher than the reference voltage VDIODE, the noise-protected analog sensing voltage VC' is also higher than the noise-protected reference voltage VDIODE'. As such, a voltage of a first node N1 is higher than a voltage of a second node N2. Due to the operations of the NMOS transistors NT3 and NT4, a difference between the voltage of the first node N1 and the voltage of the second node N2 increases more and more. NMOS transistors NT3 and NT4 are respectively controlled by the voltage of the first node N1 and the voltage of the second node N2. In addition, the voltage of the first node N1 and the voltage of the second node N2 are reflected to the third and fourth nodes N3 and N4. Due to the operations of the PMOS transistors PT1 and PT2, a difference between the voltage of the third node N3 and the voltage of the fourth node N4 also increases more and more. PMOS transistors PT1 and PT2 are respectively controlled by the voltage of the third node N3 and the voltage of the fourth node N4. As a result, the voltage of the third node N3 transitions to a high level and the voltage of the fourth node N4 transitions to a low level. Here, an output signal of the inverter 612 is at a high level. Accordingly, the comparison result signal VO is output at the high level.

If the analog sensing voltage VC is lower than the reference voltage VDIODE, the difference between the voltage of the third node N3 and the voltage of the fourth node N4 may change opposite to an example where the analog sensing voltage VC is higher than the reference voltage VDIODE. In other words, the voltage of the third node N3 transitions to the low level and the voltage of the fourth node N4 transitions to the high level. Accordingly, the comparison result signal VO may be output at a low level.

Figure 6B:
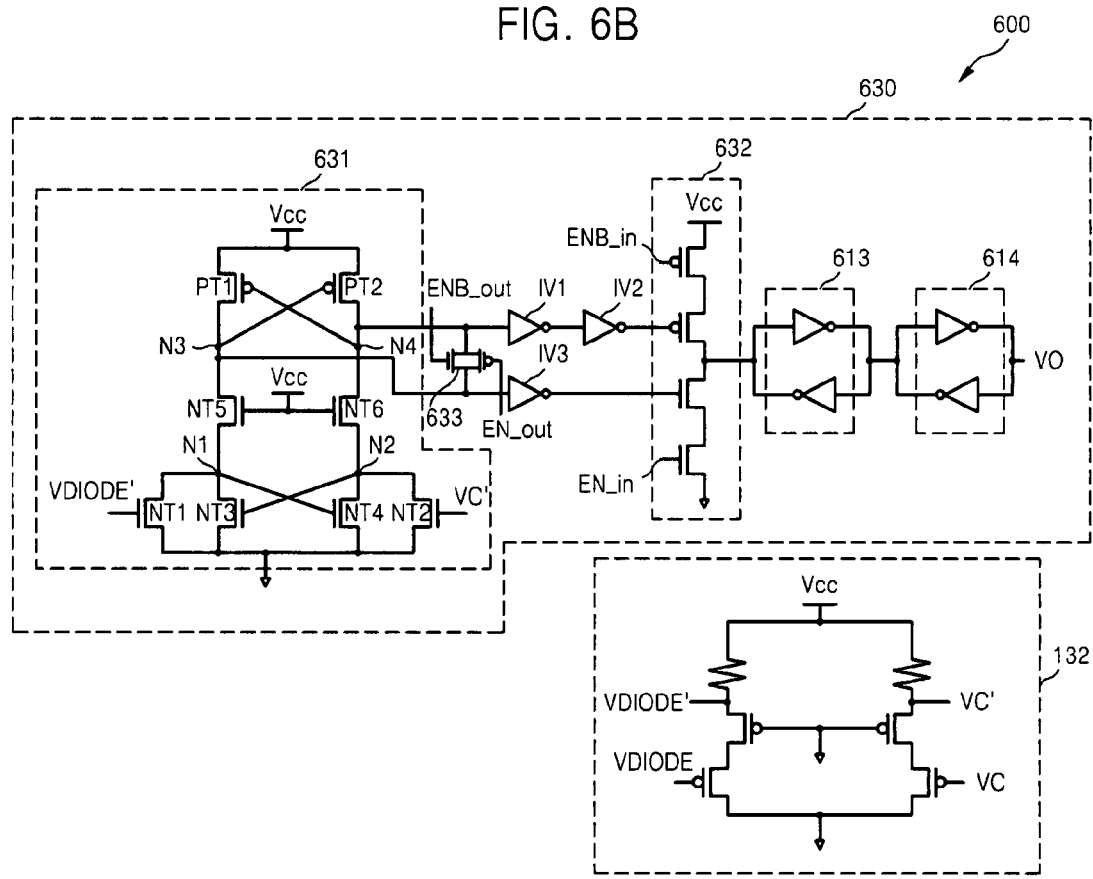
FIG. 6B is a circuit diagram of a comparator illustrated in FIG. 3, according to an example embodiment.

FIG. 6B is a circuit diagram of the comparator 600, according to example embodiment. Noise protection may be more enhanced in the comparator 600 illustrated in FIG. 6B if compared to the comparator 130 illustrated in FIG. 6A.

Referring to FIG. 6B, the comparator 600 may include a comparison circuit 630 and the noise protection circuit 132. The structure of the noise protection circuit 132 illustrated in FIG. 6B is the same or substantially similar as that illustrated in FIG. 6A. Thus, a detailed description thereof will be omitted herein for the sake of brevity.

The comparison circuit 630 may include a main comparison block 631, a plurality of inverters IV1 through IV3, inverter 632, first latch 613, second latch 614, and transmission gate 633. The main comparison block 631 may be similar to the main comparison block 611, with the exceptions that a power supply voltage Vcc (instead of the enable signal EN) is input to the gates of NMOS transistor NT5 NMOS transistor NT6, and that the PMOS transistors PT3 and PT4 operating in response to the enable signal EN in the main comparison block 611 have been omitted.

Because the gates of the NMOS transistors NT5 and NT6 in the main comparison block 631 are connected to the power supply voltage Vcc, noise is reduced as compared to a structure in which the enable signal EN is input to the gates of the NMOS transistors NT5 and NT6.

In the comparison circuit 630, the transmission gate 633 is connected between the third node N3 and the fourth node N4. The transmission gate 633 may be turned on/off in response to a first comparator control signal EN_out and its inverted signal ENB_out. Referring to FIG. 6D, the first comparator control signal EN_out transitions to "1" at almost the same time as the enable signal EN transitions to "1". The first comparator control signal EN_out may transit to "0" a predetermined (or alternatively, a desired) period of time after the enable signal EN transitions to If the first comparator control signal EN_out is "0", the transmission gate 633 may be turned on so that the voltage of the third node N3 is substantially similar or equal to the voltage of the fourth node N4. If the first comparator control signal EN_out is "1", the transmission gate 633 may be turned off so that the third node N3 may be isolated from the fourth node N4. Accordingly, the transmission gate 633 may equalize the voltages of input nodes of the inverters IV1 and IV3 if the enable signal EN is "0", and may help the comparison circuit 630 operate normally if the enable signal EN is "1".

As compared to the inverter 612 illustrated in FIG. 6A, the inverter 632 illustrated in FIG. 6B may further include an NMOS transistor responding to a second comparator control signal EN_in and a PMOS transistor responding to its inverted signal ENB_in. The inverter 632 may operate only if the second comparator control signal EN_in is "1", and may not operate otherwise such that an output value of the inverter 632 may not change. Referring to FIG. 6D, the second comparator control signal EN_in transitions to "1" a predetermined (or alternatively, a desired) period of time after the enable signal EN transitions to "1," and transitions to "0" a predetermined (or alternatively, a desired) period of time after the enable signal EN transitions to "0".

Figure 6C:
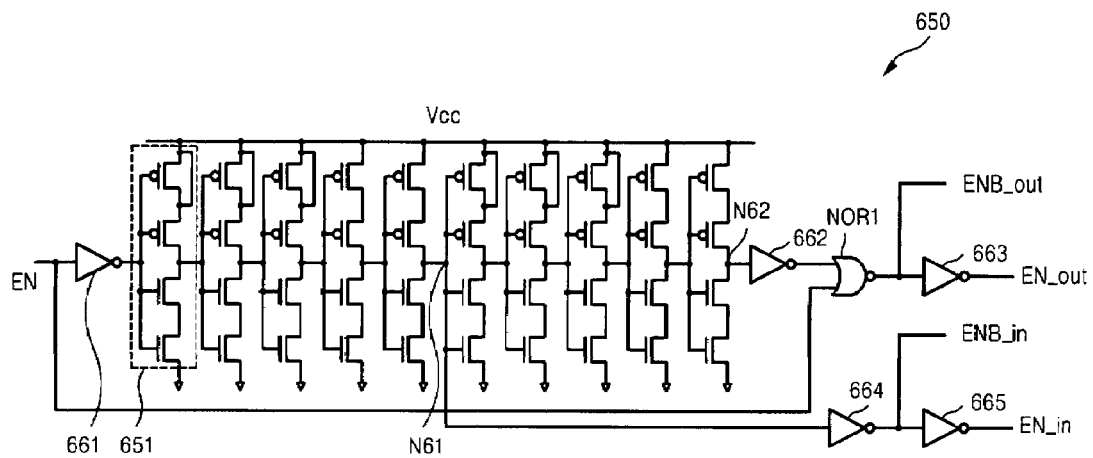
FIG. 6C is a circuit diagram of a control signal generator which generates comparator control signals input to the comparator illustrated in FIG. 6B.
Figure 6D:
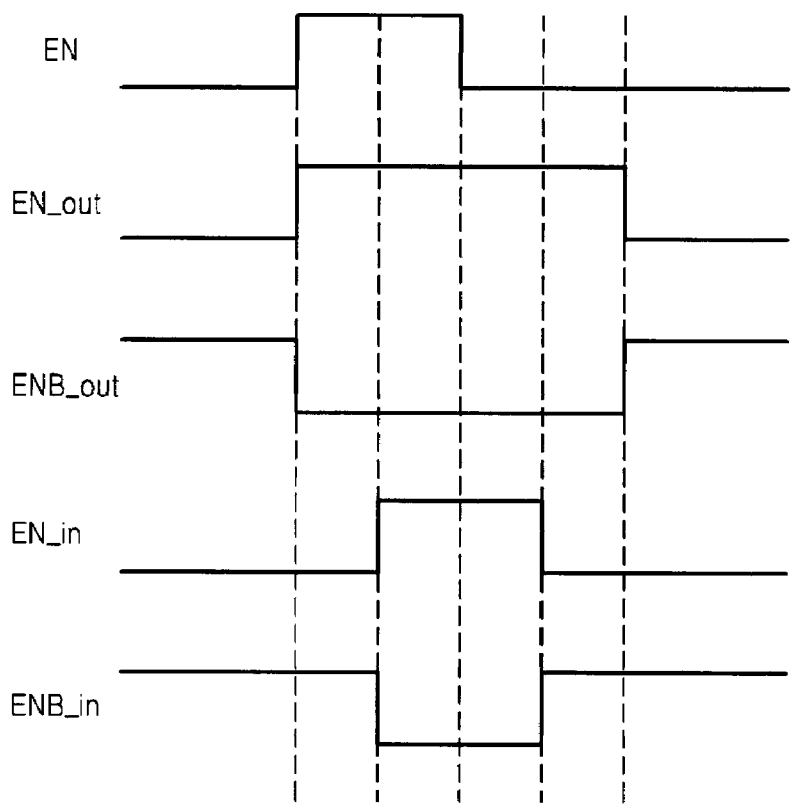
FIG. 6D is a timing chart of the comparator control signals input to the comparator illustrated in FIG. 6B.

FIG. 6C is a circuit diagram of a control signal generator 650 which may generate the comparator control signals EN_out, ENB_out, EN_in, and ENB_in input by the comparator 600 illustrated in FIG. 6B. The control signal generator 650 may include a plurality of inverters 651 which are connected in a chain form. The control signal generator 650 may further include typical inverters 661 through 665 and NOR gate NOR1.

The NOR gate NOR1 may perform a NOR operation on the enable signal EN, and an output signal of the inverter 662, so as to generate the inverted signal ENB_out of the first comparator control signal EN_out. The inverted signal ENB_out may be inverted by the inverter 663 and output as the first comparator control signal EN_out. In addition, the second comparator control signal EN_in and its inverted signal ENB_in may be obtained from a middle node N61 in the inverter chain.

FIG. 6D is a timing chart of the comparator control signals EN_out, ENB_out, EN_in, and ENB_in. Referring to FIG. 6D, the first comparator control signal EN_out transitions to "1" almost at the same time(or alternatively, at substantially the same time) as the enable signal EN transitions to "1" and then transitions to "0" a predetermined or desired period of time after the enable signal EN transitions to "0". Accordingly, if the enable signal EN transitions to "1", the first comparator control signal EN_out immediately, or almost immediately, transitions to "1" and the transmission gate 633 of the comparison circuit 630 is turned off. The second comparator control signal EN_in transitions to "1" a predetermined or desired period of time after the enable signal EN transitions to "1" and the inverter 632 illustrated in FIG. 6B may be enabled. Accordingly, there may be sufficient time to change a voltage value between the third and fourth nodes N3 and N4 according to an input. As a result, the inverter 632 is turned on after satisfactory voltage transition such that a correct output may be obtained according to the input.

If the enable signal EN transitions to "0", the second comparator control signal EN_in and the first comparator control signal EN_out sequentially transit to "0". In other words, if the enable signal EN transitions to "0", the inverter 632 is turned off first such that the comparison result signal VO may not be affected by the input change in the inverter 632, and the transmission gate 633 is turned on subsequently.

Figure 7:
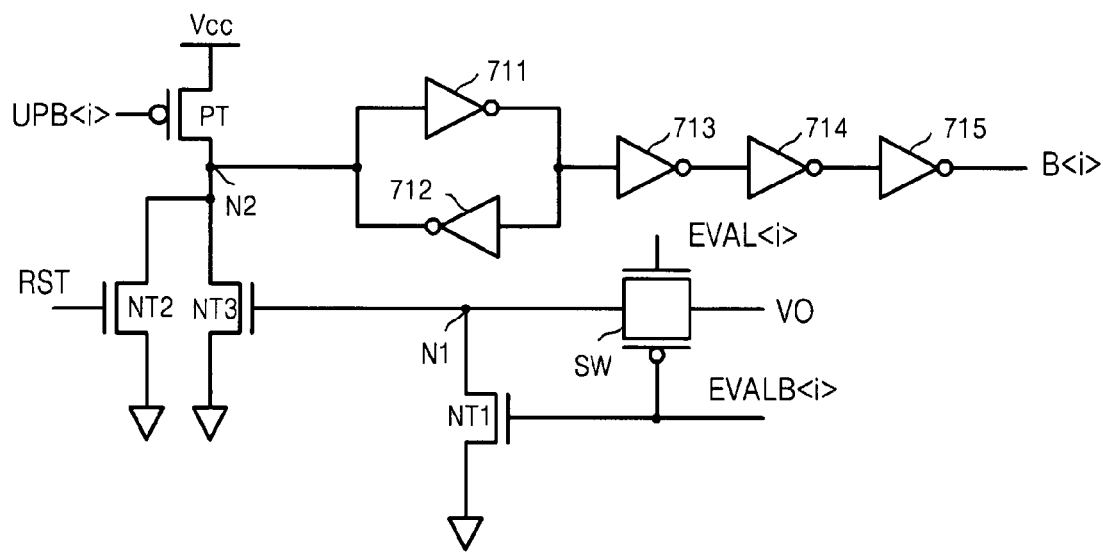
FIG. 7 is a circuit diagram of a portion of a second storage circuit included in a digital signal generator illustrated in FIG. 3.

FIG. 7 is a circuit diagram of a portion of the second storage circuit 151 included in the digital signal generator 150 illustrated in FIG. 3. In example embodiments, the second storage circuit 151 may be implemented by an 8-bit register. FIG. 7 illustrates a 1-bit register in the example 8-bit register. The 8-bit register may include eight 1-bit registers. However, it should be understood that example embodiments are not limited to only 8-bit registers, as the use of alternatively sized registers may also be applicable to example embodiments.

Referring to FIG. 7, the 1-bit register may include a switch SW, a plurality of NMOS transistors NT1 through NT3, a PMOS transistor PT, and a plurality of inverters 711 through 715. The switch SW may be turned on/off in response to a signal EVAL<i> output from a shift register (illustrated in FIGS. 8A and 8B). The NMOS transistor NT1 may be turned on/off in response to an inverted signal EVALB<i> of the signal EVAL<i>. The NMOS transistor NT2 may be turned on/off in response to the reset signal RST. The NMOS transistor NT3 may be turned on/off in response to the comparison result signal VO if the switch SW is turned on. The PMOS transistor PT may be turned on/off in response to an inverted signal UPB<i> of a signal UP<i>. A voltage level of a second node N2 may be determined according to the ON/OFF state of the NMOS transistors NT2 and NT3, and the PMOS transistor PT. A value of a current bit B<i> in the digital signal B<7:0> may be determined based upon the determined voltage level of the second node N2, where "i" is an integer from 0 to 7.

In at least one example embodiment, the reset signal RST may be externally applied to a semiconductor apparatus or may be internally generated in the semiconductor apparatus. The signals EVAL<i> and UP<i> may be output from the shifter register 153, which will be described in more detail subsequently.

If the reset signal RST is activated to a high level, the voltage of the second node N2 may transit to a low level due to the NMOS transistor NT2. Thus a digital bit signal B<i> may be reset to a low level. If the signal UP<i> is activated to a high level, and thus the inverted signal UPB<i> transitions to a low level, the voltage of the second node N2 may transit to a high level due to the PMOS transistor PT. Thus the digital bit signal B<i> may transit to a high level.

If the signal EVAL<i> is activated to a high level and the signal UP<i> is activated to the high level, the digital bit signal B<i> may be determined according to the comparison result signal VO. For example, if the comparison result signal VO output from the comparator 130 is at a high level, that is, the analog sensing voltage VC is higher than the reference voltage VDIODE, a voltage of a first node N1 is at a high level and the NMOS transistor NT3 is turned on. Therefore, the voltage of the second node N2 may transit to the low level. As a result, the digital bit signal B<i> transitions to the low level.

Alternatively, if the comparison result signal VO output from the comparator 130 is at a low level, that is, the analog sensing voltage VC is lower than the reference voltage VDIODE, the voltage of the first node N1 is at a low level and the NMOS transistor NT3 is turned off. Therefore, the voltage of the second node N2 may remain in the previous state (e.g., the high level). As a result, the digital bit signal B<i> may remain at the high level.

Figure 8A:
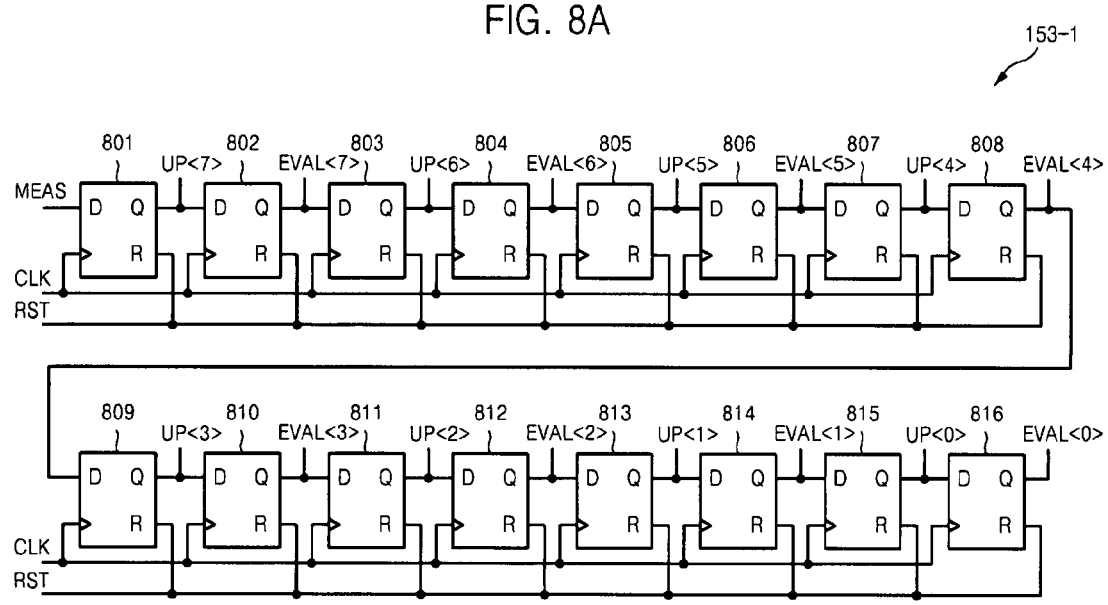
FIGS. 8A and 8B are circuit diagrams of a shift register illustrated in FIG. 3.
Figure 8B:
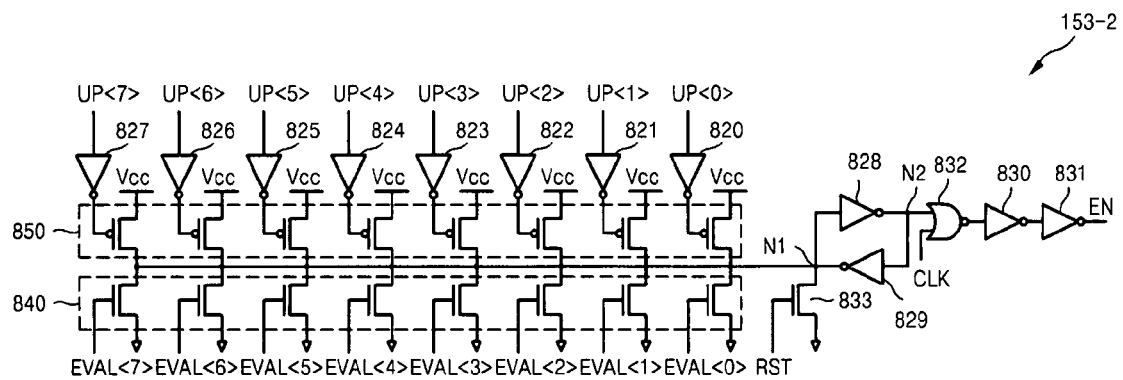

FIGS. 8A and 8B are circuit diagrams of the shift register 153 illustrated in FIG. 3. The shift register 153 may include a flip-flop circuit 153-1 and an enable signal generator 153-2.

Referring to FIG. 8A, the flip-flop circuit 153-1 may include 16 D flip-flops 801 through 816 connected in series. The 16 D flip-flops may implement a 16-stage shift register. For clarity of the description with regards to the structure illustrated, hereinafter the 16 D flip-flops 801 through 816 are referred to as first through sixteenth flip-flops 801 through 816.

The reset signal RST and a clock signal CLK may be input by a reset terminal R and a clock terminal, respectively, in each of the first through sixteenth flip-flops 801 through 816. The first flip-flop 801 may receive the measurement signal MEAS through an input terminal D. The second through sixteenth flip-flops 802 through 816 respectively receive signals output from their previous flip-flops 801 through 815 through their input terminals D.

Referring to FIG. 8B, the enable signal generator 153-2 may include a plurality of inverters 820 through 831, a NOR gate 832, NMOS transistors 833 and 840, and PMOS transistors 850. The NMOS transistor 833 may operate in response to the reset signal RST such that a first node N1 is at a low level, whereby the enable signal EN is at a low level. Each of the NMOS transistors 840 may be turned on/off in response to a corresponding EVAL<i> signal and each of the PMOS transistors 850 may be turned on/off in response to an inverted signal of a corresponding UP<i> signal.

Figure 9:
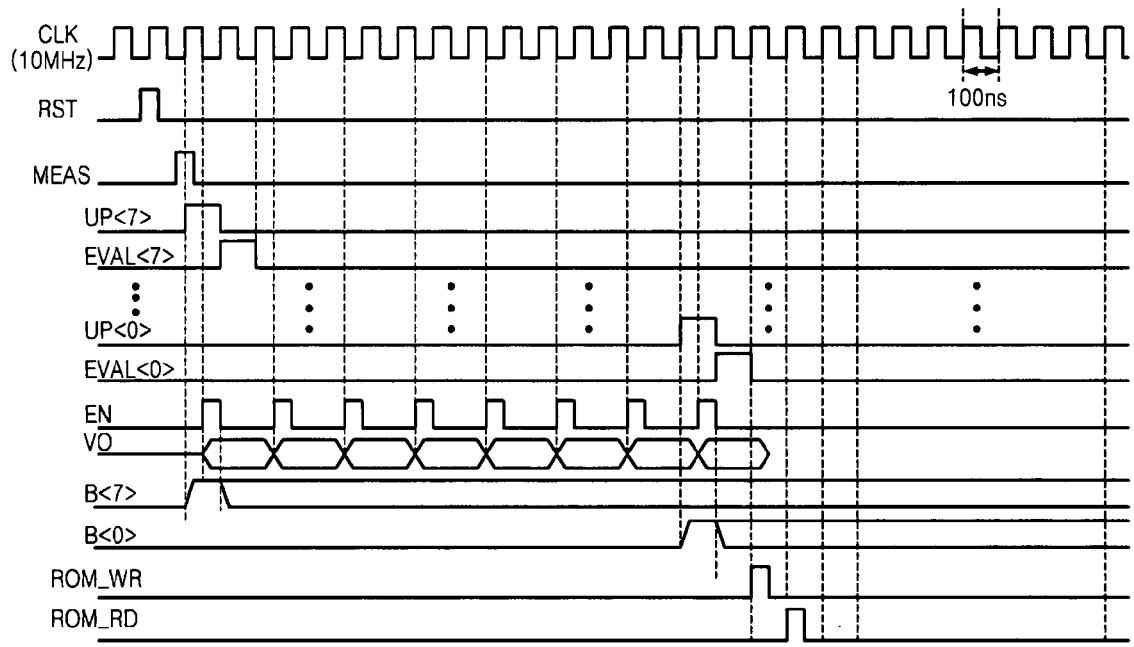
FIG. 9 is a timing chart of a 1-bit register illustrated in FIG. 7 and the shift register illustrated in FIGS. 8A and 8B.

FIG. 9 is a timing chart of the 1-bit register illustrated in FIG. 7, the shift register 153 including the flip-flop circuit 153-1 illustrated in FIG. 8A, and the enable signal generator 153-2 illustrated in FIG. 8B. The operations of the 1-bit register and the shift register 153 including the flip-flop circuit 153-1 and the enable signal generator 153-2 will be described with reference to FIGS. 7 through 9.

In example embodiments, the clock signal CLK, the reset signal RST, and the measurement signal MEAS may be externally applied to and/or internally generated in the semiconductor apparatus.

The first through sixteenth flip-flops 801 through 816 may be reset in response to the reset signal RST. If the measurement signal MEAS may be activated at a high level of "1", the first flip-flop 801 may output an UP<7> signal in response to a rising edge of the clock signal CLK. Accordingly, the UP<7> signal may transit to the high level at the rising edge of the clock signal CLK after the measurement signal MEAS is activated to the high level and subsequently transitions to a low level in one cycle of the clock signal CLK. The second flip-flop 802 may receive the UP<7> signal and outputs EVAL<7> signal delayed by about one clock signal. In this manner, the third through sixteenth flip-flops 803 through 816 sequentially output, delayed by about one clock cycle, UP<6>, EVAL<6>, UP<0>, and EVAL<0> signals, respectively.

The 16 bit signals (e.g., UP<7>, EVAL<7>, . . . , UP<0>, and EVAL<0> signals) output from the first through sixteenth flip-flops 801 through 816 may be separately applied to eight 1-bit registers included in the 8-bit register 151, respectively.

The UP<7>, EVAL<7>, . . . , UP<0>, and EVAL<0> signals may also be input by the enable signal generator 153-2. The enable signal generator 153-2 may activate the enable signal EN to the high level in response to the UP<i> signal and the clock signal CLK. The enable signal generator may deactivate the enable signal EN (e.g., reset to the low level) in response to the EVAL<i> signal and the clock signal CLK. For example, when one signal among the UP<7> through UP<0> signals is activated to the high level, one signal among the PMOS transistors 850 may be turned on, and thus the voltage of the first node N1 illustrated in FIG. 8B may be at the high level.

Accordingly, if the clock signal CLK transitions to the low level in a state where one signal among the UP<7> through UP<0> signals is at the high level, an output signal of the NOR gate 832 may be at the high level, and thus, the enable signal EN may be activated to the high level. If the EVAL<i> signal is activated to the high level in a state where the enable signal EN is at the high level, one signal among the NMOS transistors 840 may be turned on, and thus, the voltage of the first node N1 (FIG. 8B) may transit to the low level. Subsequently, the enable signal EN is deactivated (e.g., reset to the low level).

Accordingly, the enable signal EN may be activated to the high level in a section where one of the UP<7> through UP<0> signals is activated to the high level and the clock signal CLK is at the low level.

Referring to FIG. 7, the 1-bit register may output the bit signal B<i> in the digital signal B<7:0> in response to the corresponding UP<i> signal (where i=0 through 7).

It is assumed that the 1-bit register illustrated in FIG. 7 operates in response to the UP<7> and EVAL<7> signals. For example, if the UP<7> signal is enabled at the high level, its inverted signal UPB<7> may transit to the low level, and thus, the voltage of the second node N2 may transit to the high level. As a result, the digital bit signal B<7> may be output at the high level of "1". Subsequently, a digital signal of 10000000 may be input to the R-2R ladder 110 and the analog sensing signal VC corresponding to the digital signal 10000000 may be output. If the enable signal EN is activated to the high level, the comparator 130 (FIG. 3) may be enabled, may compare the analog sensing voltage VC with the reference voltage VDIODE, and may output the comparison result signal VO. The comparison result signal VO may be transmitted to the first node N1 (FIG. 7) in the 1-bit register while the EVAL<7> signal is at the high level. Accordingly, the 1-bit register may output the digital bit signal B<7> based on the comparison result signal VO while the EVAL<7> signal is at the high level. If the comparison result signal VO is at the high level (that is, the analog sensing voltage VC is higher than the reference voltage VDIODE), the voltage of the second node N2 (FIG. 7) may transit to the low level due to the NMOS transistor NT3. For example, the NMOS transistor NT3 may be turned on in response to the high level of the comparison result signal VO. As a result, the digital bit signal B<7> may transit to the low level. Contrarily, if the comparison result signal VO is at the low level (that is, the analog sensing voltage VC is lower than the reference voltage VDIODE), the digital bit signal B<7> may remain at the high level.

As an example scenario, it may be assumed that the 1-bit register illustrated in FIG. 7 operates in response to the UP<6> and EVAL<6> signals. In this example, similar to the operation of the 1-bit register operating in response to the UP<7> and EVAL<7> signals, if the UP<6> signal is enabled at the high level, its inverted signal UPB<6> transitions to the low level, and thus, the voltage of the second node N2 transitions to the high level. As a result, the digital bit signal B<6> may be output at the high level of "1". Subsequently, a digital signal of 11000000 or 01000000 may be input to the R-2R ladder 110 and the analog sensing signal VC corresponding to the digital signal 11000000 or 01000000 may be output. If the enable signal EN is activated to the high level, the comparator 130 (FIG. 3) may be enabled, may compare the analog sensing voltage VC with the reference voltage VDIODE, and may output the comparison result signal VO. Subsequently, the 1-bit register may maintain the digital bit signal B<6> at "1" or may change it to "0" based on the comparison result signal VO.

The other 1-bit registers may operate in the same or in a substantially similar manner as the above described 1-bit registers. For example, if bits in an N-bit digital signal are sequentially set to the high level starting from the MSB (e.g., B<7>) to the LSB (e.g., B<0>), the analog sensing voltage VC obtained each time a bit in the N-bit digital signal is set to the high level is compared with the reference voltage VDIODE. Subsequently, the current bit in the N-bit digital signal is changed or maintained according to a comparison result. This comparing and changing or maintaining operation may be performed N times such that the values of individual bits in the N-bit digital signal may be determined.

For example, the N-bit digital signal determined through the above-described operations may be input to the first storage circuit 140 in response to the ROM write signal ROM_WR. The digital signal stored in the first storage circuit 140 may be read from the first storage circuit 140 in response to the ROM read signal ROM_RD and may be output via the buffer 161.

Figure 10:
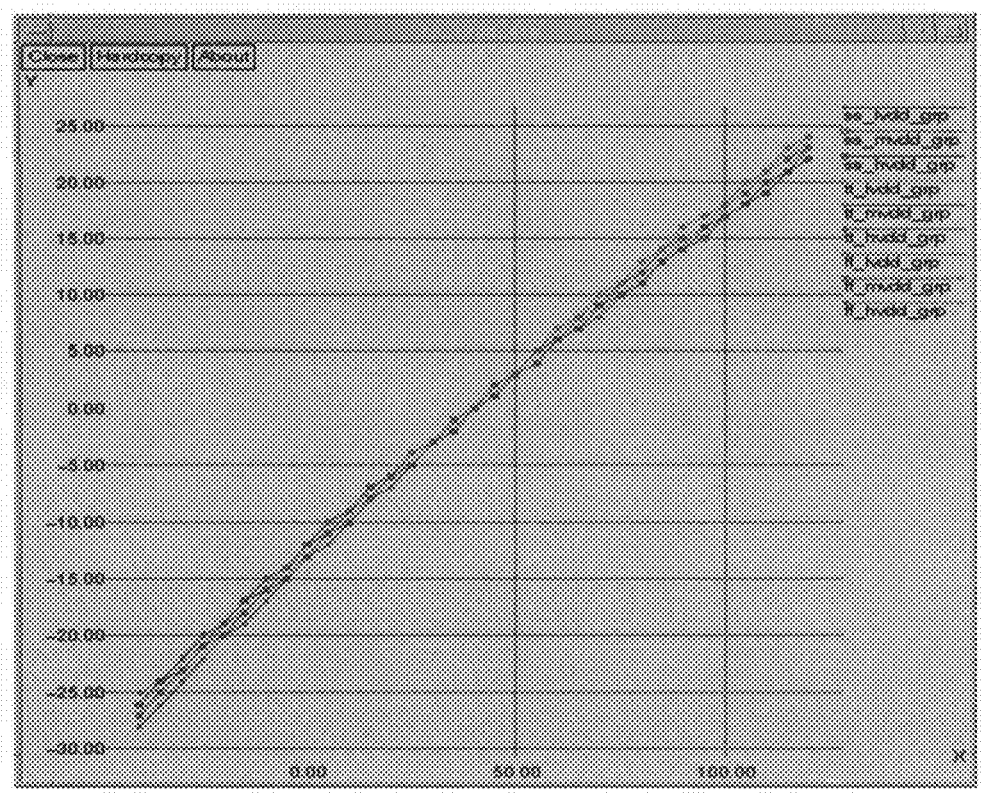
FIG. 10 is a graph illustrating linearity between temperature and digital output signals as results of simulating a temperature sensor according to example embodiments in various manufacturing processes.

FIG. 10 is a graph illustrating linearity between temperature and an output digital signal as results of simulating a temperature sensor according to example embodiments in various manufacturing processes. Referring to FIG. 10, the values of a digital signal (corresponding to the Y-axis) measured with respect to a test (i.e., reference) digital signal have linearity with respect to the change in temperature (corresponding to the X-axis). This may be because the changes in the manufacturing processes and an offset of the comparator 130 are equally (or at least substantially equally) reflected to both of a digital signal (i.e., the first digital signal) with respect to a reference temperature, and a digital signal (i.e., the second digital signal) with respect to a measured temperature. The linearity of the digital signal with respect to the temperature is an advantage of example embodiments.

Figure 11A:
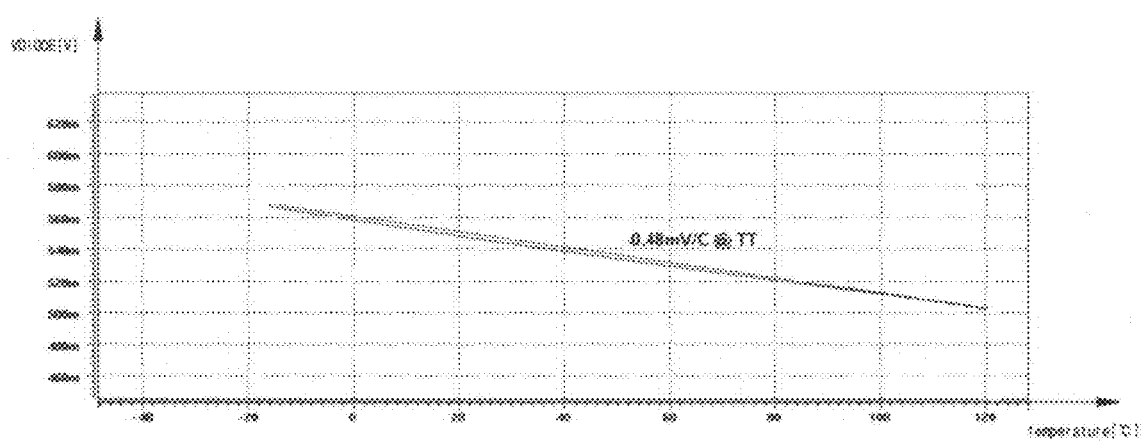
FIG. 11A illustrates a result of simulating the non-linearity of temperature in a diode.
Figure 11B:
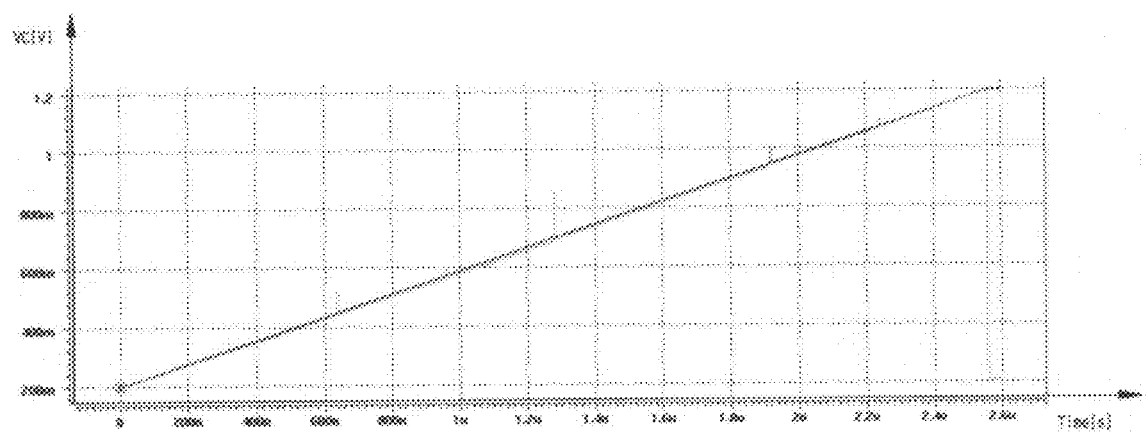
FIG. 11B illustrates a result of simulating the non-linearity of an R-2R ladder.

FIG. 11A illustrates the result of simulating the non-linearity of temperature in a diode. FIG. 11B illustrates the result of simulating the non-linearity of an R-2R ladder.

Referring to FIG. 11A, an output voltage of a diode has a certain non-linearity with respect to temperature. Referring to FIG. 11B, an output voltage of the R-2R ladder also has a certain non-linearity. If the non-linearity of the diode and the non-linearity of the R-2R ladder are made to have the same polarity, the inherent non-linearity of the output voltage with respect to the temperature in the diode may be compensated for.

Figure 12:
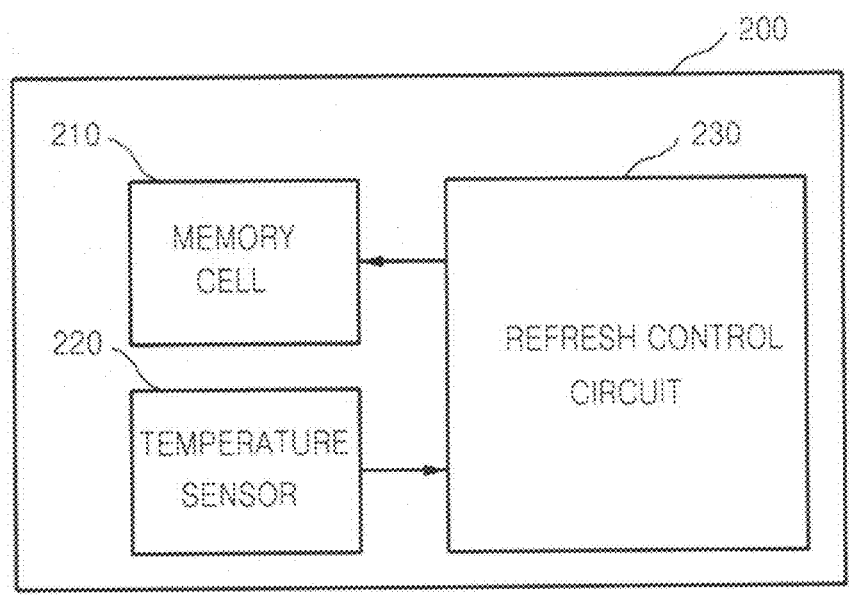
FIG. 12 is a block diagram of a semiconductor apparatus including a temperature sensor, according to an example embodiment.

FIG. 12 is a block diagram of a semiconductor apparatus 200 including a temperature sensor 220, according to an example embodiment. Referring to FIG. 12, the semiconductor apparatus 200 may include a memory cell 210, a temperature sensor 220, and a refresh control circuit 230.

The temperature sensor 220 may measure internal temperature of the semiconductor apparatus 200. The temperature sensor 220 may be the temperature sensor 100 illustrated in FIG. 3 and/or may further include an additional circuit for processing output data OUT from the data output unit 160 as compared to the temperature sensor 100. The additional circuit may calculate a temperature corresponding to the second digital signal using a difference between the first digital signal and the second digital signal.

The refresh control circuit 230 may output a self-refresh clock for controlling a self-refresh period to the memory cell 210 in response to an output of the temperature sensor 220.

As described above, according to example embodiments sensing temperature resolution may be increased while a smaller circuit area may be required. Also, errors occurring due to the change in manufacturing processes may be automatically corrected. In addition, example embodiments may not require temperature trimming, may correct comparator offset, and may compensate for non-linearity of an output voltage with respect to temperature in a diode.

While example embodiments have been particularly shown and described with reference to attached drawings, it will be understood by those of ordinary skill in the art that various changes in form and details may be made therein without departing from the spirit and scope of the present invention as defined by the following claims.

What is claimed is:

1. A self-calibrating temperature sensor comprising:
   a reference voltage generator to generate a reference voltage based on temperature;
   a digital-to-analog converter to convert a first digital signal into an analog sensing voltage;
   a comparator to compare the reference voltage with the analog sensing voltage, and to generate a comparison result signal;
   a digital signal generator to generate and update the first digital signal based on the comparison result signal;
   a first storage circuit to store the first digital signal based on a first temperature; and
   a data output unit to output data corresponding to a second temperature based on the first digital signal and a second digital signal output from the digital signal generator under the second temperature,
   wherein the digital-to-analog converter receives an N-bit digital signal output from the digital signal generator.

2. The temperature sensor of claim 1, wherein the first digital signal is an N-bit digital signal, and N is an integer greater than or equal to 1.

3. The temperature sensor of claim 1, wherein the reference voltage generator includes a semiconductor junction diode.

4. The temperature sensor of claim 3, wherein the semiconductor junction diode is formed of a metal-oxide semiconductor transistor.

5. The temperature sensor of claim 1, wherein the digital-to-analog converter includes an N-bit R-2R ladder.

6. The temperature sensor of claim 1, wherein the digital-to-analog converter has non-linearity of the same polarity as non-linearity of the reference voltage generator with respect to temperature.

7. The temperature sensor of claim 1, wherein the first storage circuit is a non-volatile memory device.

8. The temperature sensor of claim 1, wherein:
   the first storage circuit includes an anti-fuse circuit having a plurality of anti-fuses; and
   the first storage circuit stores the first digital signal with selective short circuits of the anti-fuses.

9. The temperature sensor of claim 1, wherein the digital signal generator comprises:
   a second storage circuit to selectively update and store a current bit in the first digital signal based on the comparison result signal; and
   a controller to output an enable signal to the comparator and output a control signal to control operation of the second storage circuit.

10. The temperature sensor of claim 9, wherein:
    the second storage circuit includes a plurality of bit registers to store all bits in the first digital signal;
    each bit register of the plurality of bit registers sets a corresponding bit in the first digital signal to a first logic level in response to a first control signal;
    each bit register of the plurality of bit registers receives the comparison result signal in response to a second control signal; and
    each bit register of the plurality of bit registers maintains the corresponding bit at the first logic level or changes the corresponding bit to a second logic level according to the comparison result signal.

11. The temperature sensor of claim 10, wherein the controller activates the first control signal, the enable signal, and the second control signal sequentially with respect to each bit in the first digital signal, from a most significant bit to a least significant bit.

12. The temperature sensor of claim 10, wherein the controller comprises:
    a 2N-bit shift register to activate the first control signal and the second control signal with a period of one cycle of a clock signal based on the clock signal and a measurement signal; and
    an enable signal generator to generate the enable signal based on the first control signal, the second control signal, and the clock signal.

13. The temperature sensor of claim 1, wherein the comparator comprises:
    a main comparison block to compare the reference voltage and the analog sensing voltage, and output a differential output signal;
    an inverter to generate the comparison result signal based on the differential output signal; and
    at least one latch to latch the comparison result signal.

14. The temperature sensor of claim 13, wherein the comparator further comprises a transmission gate connected between differential output nodes through which the differential output signals are output and is turned on/off in response to a first comparator control signal based on the enable signal, and the inverter operates in response to a second comparator control signal based on the enable signal.

15. The temperature sensor of claim 1, wherein the data output unit outputs data corresponding to the second temperature based on a difference between the first digital signal and the second digital signal.

16. A semiconductor apparatus comprising:
    the temperature sensor of claim 1; and
    a refresh control circuit to control a self-refresh cycle based on the data output by the data output unit.

17. A temperature sensing method comprising:
    generating and storing a first digital signal based on a comparison of a reference voltage corresponding to a first temperature and a sensing voltage;
    generating a second digital signal based on a comparison of a reference voltage corresponding to a second temperature and the sensing voltage; and
    generating data corresponding to the second temperature based on the first digital signal and the second digital signal.

18. The temperature sensing method of claim 17, wherein generating and storing the first digital signal comprises:
    converting the first digital signal into the sensing voltage;
    comparing the reference voltage corresponding to the first temperature with the sensing voltage; and
    selectively updating at least one bit in the first digital signal based on the comparison result.

19. The temperature sensing method of claim 17, wherein generating the second digital signal comprises:
- converting the second digital signal into the sensing voltage;
- comparing the reference voltage corresponding to the second temperature with the sensing voltage; and
- selectively updating at least one bit in the second digital signal based on the comparison result.

20. The temperature sensing method of claim 17, wherein generating and storing the first digital signal comprises:
- setting a current bit in the first digital signal to a first logic level in response to a first control signal;
- converting the first digital signal into an analog voltage;
- comparing the analog voltage with the reference voltage corresponding to the first temperature and outputting a comparison result signal; and
- maintaining the current bit at the first logic level or changing the current bit to a second logic level based on the comparison result signal.

21. The temperature sensing method of claim 17, wherein generating data corresponding to the second temperature comprises:
- obtaining a difference between the first digital signal and the second digital signal; and
- outputting the data corresponding to the second temperature based on difference.

22. A method of controlling a self-refresh period comprising:
- the temperature sensing method of claim 17; and
- controlling the self-refresh period of a semiconductor apparatus based on the data corresponding to the second temperature.

* * * * *